Jan. 13, 1970  R. W. BLAIR  3,489,999
VEHICLE HANDBRAKE AND GENERATOR SIGNAL SYSTEM
Filed Oct. 27, 1967

INVENTOR
Rolla W. Blair

BY Carl T. Mack.
ATTORNEY

United States Patent Office 3,489,999
Patented Jan. 13, 1970

1

3,489,999
VEHICLE HANDBRAKE AND GENERATOR
SIGNAL SYSTEM
Rolla W. Blair, 14 Alpark Ave.,
Pittsburgh, Pa. 15216
Filed Oct. 27, 1967, Ser. No. 678,578
Int. Cl. B60q 1/44
U.S. Cl. 340—69                               5 Claims

ABSTRACT OF THE DISCLOSURE

The principal feature of this invention, in the art relating to vehicle handbrakes and generator signal systems, is to provide a diode in the charging circuit so that current can flow from the generator to the battery, but cannot flow from the battery to the generator. There is a complete separation of the relay coil and contacts with respect to the diode, the coil of the relay being connected at one of its terminals to the charging circuit between the generator and the diode; the other terminal being connected to ground. One side of the relay contact is connected on one side between the diode and the battery and the other side of the relay contact is connected to a contact of a single pole double-throw switch, which is arranged to be actuated by the handbrake operating mechanism. Hence, there are provided two circuits, one on one side of the diode, the other on the other side of the diode, both merging at a common terminal in a circuit including a signal lamp. The single pole double-throw switch which is electrically connected with said common treminal and said signal has a contact which is closed when the handbrake is set and these are connected to the charging circuit between the generator and the diode. Another contact of said single pole double-throw switch which is closed when the handbrake is released, is connected to the contact circuit of the relay so that the relay contact and the closed contact of the switch must both be closed to complete a circuit to the brake signal.

---

This invention relates to an improved brake signal for automobiles and has, for one of its principal objects, means for automatically indicating to the operator of an automobile the position of the handbrake sometimes referred to as the emergency or parking brake.

The present invention is an improvement over my invention for a vehicle handbrake and generator signal system described in Patent No. 3,286,231, patented Nov. 15, 1966, and granted to this applicant.

One of the principal objects of the invention is to provide a means whereby the operator will be warned by a signal in the automobile should he fail to set the handbrake when the automobile has been stopped and the motor is not running.

Another object of the invention is to provide a means whereby the operator will be warned by the same signal as above, should he fail to release the handbrake after the motor is running, whereby the operator will be prevented from driving the automobile without first releasing the handbrake.

Another object of the invention is to provide a device using the same signal to indicate that the handbrake is set when it should have been released and that the brake has not been set when it should have been.

A further object of the invention is to provide a two-position switch whereby one circuit is closed in one position of said switch and another circuit is closed in the other position of said switch to control a handbrake position-indicating signal.

Still another object of the invention is to provide a device which employs the generated current to initiate the control signal of a handbrake position-indicating signal.

2

Another object of the invention is to employ a diode in the charging-current circuit so that current can flow from the generator to the battery, but cannot flow from the battery back to the generator.

Particular attention should be paid to the showing involving the separation of the relay coil and contacts with respect to the diode.

Figure 1:
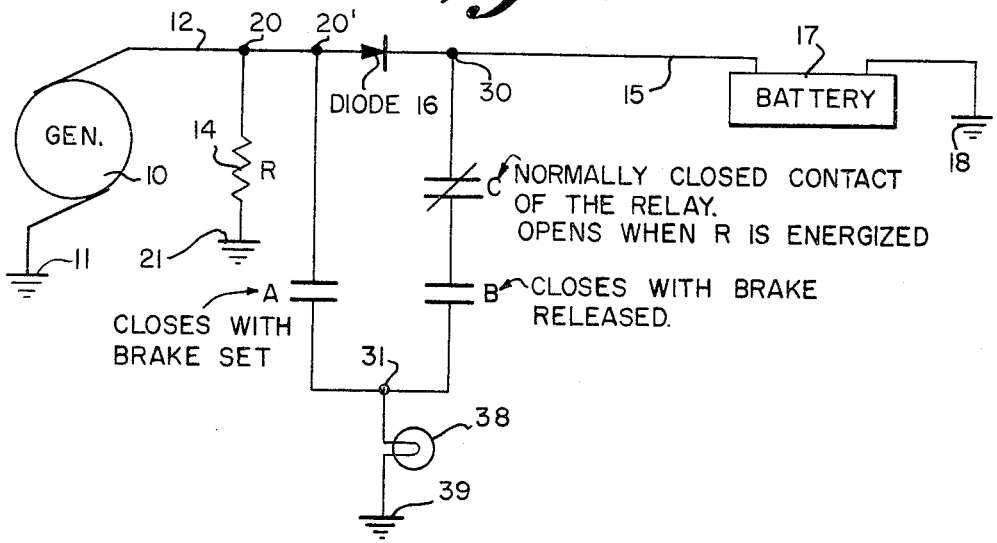
Figure 2:
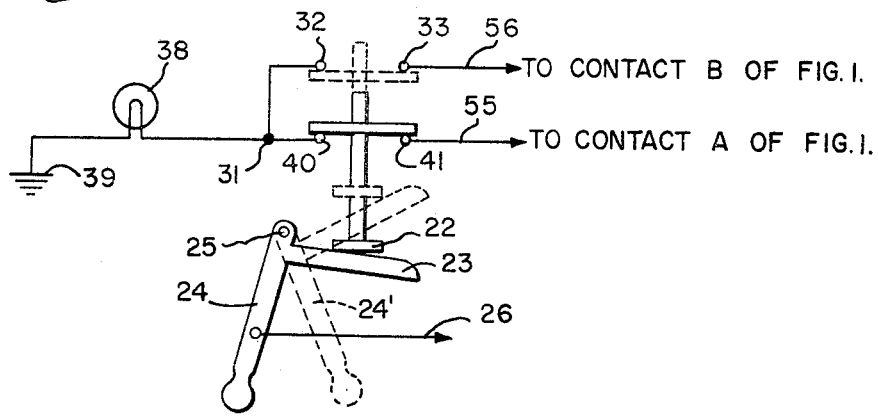

The full nature of the invention will be understood from the following specification and the accompanying drawings in which:

FIGURE 1 is a diagrammatic view, illustrating the electrical connections and installation of the improved brake-signal of this invention; and FIGURE 2 shows the single-pole double-throw switch which is shown in my Patent No. 3,286,231, as employed in the circuitry of FIGURE 1.

The following description presumes a motor driven automobile having a storage battery, for starting the motor and other uses, and an alternator or charging generator for charging said battery with the necessary wiring to said battery. The description also presumes a hand or parking brake for holding the automobile stationary when it is not in use.

Automobiles in use today are using two types of generators; the direct current generator and the alternating current generator or alternator. The alternator funishes all electical energy for the automobile and its electrical devices; it also charges the battery the energy from which is made use of when the alternator is not running.

As shown in the drawings:

The reference numeral 10 designates a generator mounted on the automobile and driven by the motor thereof. The generator is of the alternating current type known as an alternator and is in common use on today's automobiles. The frame of the alternator is grounded to the frame of the automobile at 11 and a circuit 12 permits current to flow through the coil 14 of the relay R and another circuit 15 permits current to flow through the diode 16 to battery 17 and to ground 18.

The relay R with voltage rated coil 14 suitable for the voltage of the charging generator or alternator 10 and with single pole normally closed contacts C is provided. There is provided a diode 16 of suitable rating for the charging current and voltage. There is provided a single pole double-throw switch A–B and a signal conveniently shown as a lamp 38.

The electrical connections of the component parts are as shown in FIGURE 1 with particular attention being directed to the separation of the relay coil 14 and contacts C with respect to the diode 16. Relay R is connected at one terminal 20 to the charging circuit 15 between the alternator or charging generator 10 and the diode 16 and with the other terminal 21 to ground 11. The relay contact C is connected into circuit 15 on one side 30 between the diode 16 and the battery 17 and on the other side to the B contact of the single pole double-throw switch A–B, which as shown in FIGURE 2, as well as in my prior patent, is arranged to be operated by the brake operating mechanism.

The diode 16 is connected in the charging circuit 15 so that current can flow from the generator to the battery, but cannot flow from the battery back to the generator. There is nothing new in this arrangement, it being well known in the art.

The single pole double-throw switch A–B is connected with the common terminal 31 to the signal lamp 38. The contact A, which is closed when the handbrake is set, is connected to the charging circuit between the generator and the diode, and the contact B, which is closed when the handbrake is released, is connected to the contact circuit of the relay so that the relay contact C and the switch ntact B must both be closed to complete a circuit to the nal lamp 38 and to ground 39.

To diagnose quickly the situation here involved, R is e relay and C the normally closed contact of the relay, ich opens when R is energized. A and B are contacts of single pole double-throw switch which switch is operated ' brake operating mechanism (not shown in FIGURE 1, it see FIGURE 2). Contact A closes with the handbrake t; contact B closes with the brake released.

Making reference to the diagram of FIGURE 1, when e engine is not running, and the brakes are set, the genator does not charge and since current cannot flow from e battery through the diode 16, relay R is deenergized d its normally closed contact C is closed. If the handake is released, contact B of the single pole doublerow switch is closed and current flows from the battery rough C and B to the signal lamp 38. Setting the handake opens contact B and stops the flow of current to e signal lamp.

When the engine is running, the generator will produce voltage which energizes relay R to open the contact C, d current cannot flow from the battery to the signal mp. If the handbrake is set contact A of the single pole uble-throw switch is closed and current flows from the nerator to the signal lamp 38. Releasing the handbrake ens contact A and the current flow to the signal lamp is stopped.

Reference is now made to FIGURE 2 wherein is shown e arrangement existing between the handbrake and the ngle pole double-throw switch A-B referred to above. he single pole double-throw switch A-B is mounted on e automobile and is adapted to be moved from one position to another when a projecting part 23 on the handake 24 contacts element 22 as the handbrake swings out its pivot 25 from the set position 24 to the released sition 24'. Element 26 is attached to the handbrake and ually takes the form of a cable leading to the brake (not own). The switch A-B is provided with two sets of ntacts 40-41 and 32-33. When the handbrake is moved its brake set position 24, part 23 permits element 22 to ove to its normally closed position thus causing switch -B to bridge the contacts 40-41. When the handbrake moved to its released position 24', part 23 pushes upardly against element 22 thus causing switch A-B to ridge the contact 32-33. Contact A, which is closed when e handbrake is set, is electrically connected to the charg- ig current circuit by a conductor 55 which extends from ntact 41 to terminal 20', the terminal which lies between e generator and the diode. Contact B which is closed hen the handbrake is released is electrically connected by conductor 56 which extends from contact 33 to the conct of the relay C, so that the relay contact C and conct B must be closed to complete a circuit to the signal mp 38. Contact C is connected on one side between the iode and the battery at terminal 30; on the other side the contact B of the single pole double-throw switch, us establishing a circuit to the signal lamp 38.

The arrangement of component parts and circuits will ause the signal lamp to operate as follows:
Motor not running; brake set; no signal.
Motor running; brake set; signal.
Motor running; brake released; no signal.
Motor not running; brake released; signal.

While certain specific embodiments of an improved andbrake signal device for automobiles have been dislosed in the foregoing description, it will be understood at various modifications within the spirit of the invenon may occur to those skilled in the art.

What is claimed is:

1. A safety handbrake position indicating signal for otor vehicles comprising in combination:
   (a) a signal lamp disposed so that it is visible to the operator of said vehicle,
   (b) a charging generator having a circuit connection with a battery, a diode in said circuit whereby current is permitted to flow through said diode to said battery but current is not permitted to flow from said battery to said charging generator; a second circuit extending from a point in said first circuit located between said battery and said diode and running to a common terminal, thence through said signal lamp and to ground; a third circuit extending from a point in said first circuit located between said charging generator and said diode and running to said common terminal, thence through said signal lamp and to ground; a relay coil situated in a fourth circuit extending from a point in said first circuit located between said charging generator and said diode and to a point beyond said coil and to ground; said second circuit including relay contacts which are closed when said relay coil is unenergized and open when said relay coil is energized; and a pair of contacts of a single pole double-throw switch which is adapted to be operated by the handbrake operating mechanism; one of said pair of contacts being in said third circuit and the second of said pair of contacts being in said second circuit between said relay contacts and said common terminal
   (c) the pair of contacts of said double pole doublethrow switch in said second circuit being arranged to be closed when said handbrake is released;
   (d) the pair of contacts of said double pole doublethrow switch in said third circuit being arranged to be closed when said handbrake is set; the relay contacts and said pair of contacts in said second circuit being arranged so that they both must be closed to complete a circuit to said signal lamp and to ground; whereby when the motor of said vehicle is not running and the handbrake is set, said charging generator does not charge and since current cannot flow from said battery through said diode, the said relay coil is deenergized and its normally closed contacts are closed, and no circuit to said signal lamp will be established and said signal lamp will not be energized.

2. The safety handbrake position indicating signal for motor vehicles of claim 1 whereby when the motor of said vehicle is not running and the said handbrake is released, the pair of contacts of said double pole doublethrow switch in said second circuit is arranged to be closed and current flows from said battery to said signal lamp to energize the same.

3. The safety handbrake position indicating signal for motor vehicles of claim 1 whereby when the motor of said vehicle is running, said charging generator will produce a voltage which energizes said relay coil to open said relay contacts thus preventing flow of current from said battery to said signal and whereby if said handbrake is set, said pair of contacts in said third circuit is closed and current flows from said charging generator to said signal lamp and to ground.

4. The safety handbrake position indicating signal for motor vehicles of claim 1 whereby when the motor of said vehicle is running and the said handbrake is released, the pair of contacts in said third circuit is opened and the current from the charging generator is stopped and said signal lamp will not be energized.

5. The safety handbrake position indicating signal for motor vehicles of claim 1 in which the single pole double-throw switch is connected with said common terminal to said signal lamp and the relay contacts and said pair of contacts in said second circuit are arranged so that they both must be closed to complete a circuit to said signal lamp and to ground.

References Cited

UNITED STATES PATENTS 3,286,231  11/1966  Blair _____ 340—69

JOHN W. CALDWELL, Primary Examiner

K. N. LEIMER, Assistant Examiner